Patented Apr. 9, 1940

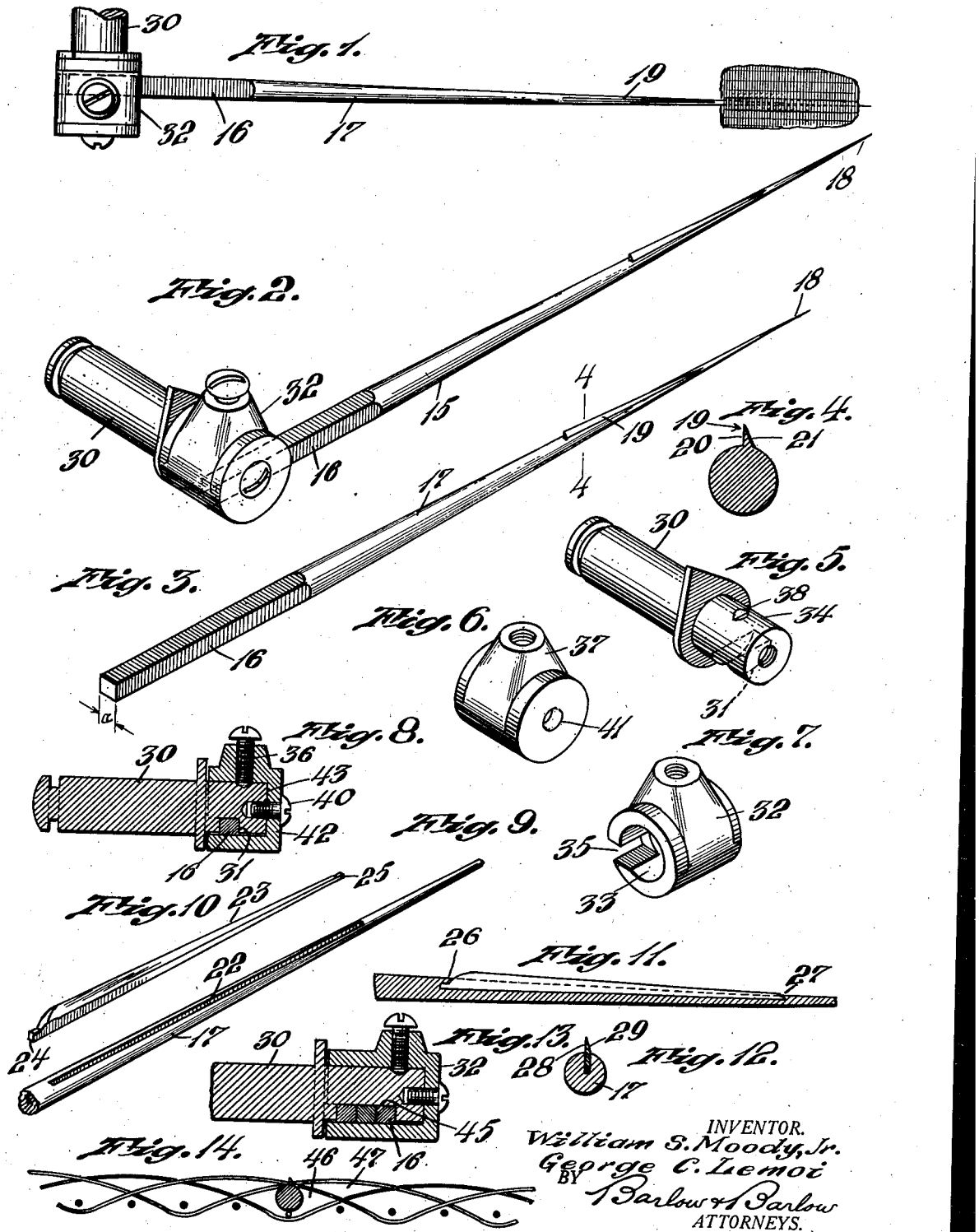

2,196,471

UNITED STATES PATENT OFFICE 2,196,471

PILE CUTTER

William S. Moody, Jr., and George C. Lemoi, Cranston, R. I., assignors to Phonograph Needle Mfg. Company, Inc., a corporation of Rhode Island Application October 26, 1937, Serial No. 171,176

8 Claims. (Cl. 26—8)

This invention relates to a device for cutting the threads which form the pile for velveteen and like fabrics; and has for one of its objects the provision of cutters which may be made more accurate such as by machine operations whereby the cutters will be duplicated permitting their interchange one with the other without noticeable effect upon the work operated upon.

Another object of the invention is to provide for cutting several rows at a time of the threads which form the pile rather than a single row at a time, as has heretofore been the usual practice.

Another object of the invention is the formation of better cutters less expensively than the inferior cutters heretofore provided.

With these and other objects in view, the invention consists of certain novel features of construction, as will be more fully described, and particularly pointed out in the appended claims.

In the accompanying drawing:

Fig. 1 is a top plan view illustrating the pile cutting device and a fragmental portion of a piece of fabric to be operated upon;

Fig. 2 is a perspective view of the device;

Fig. 3 is a perspective view of the guide and blade;

Fig. 4 is a sectional view on line 4—4 of Fig. 3;

Fig. 5 is a perspective view of the head or holder in which the guide is mounted;

Fig. 6 is a perspective view of the clamp member for binding the guide into the head;

Fig. 7 is a view of the member of Fig. 6 looking at the other side thereof;

Fig. 8 is a sectional view illustrating the clamp member and head as holding the guide in position therein;

Fig. 9 is a perspective view of a modified form of guide;

Fig. 10 is a perspective view of a separate cutter;

Fig. 11 is a sectional view showing the cutter of Fig. 10 held in the guide of Fig. 9;

Fig. 12 is a sectional view through the cutter and guide of Fig. 11;

Fig. 13 is a sectional view similar to Fig. 8 but showing a plurality of guides as held in position;

Fig. 14 is an enlarged view of the weave structure of a piece of fabric showing the position of the cutter in the fabric for severing the pile forming threads.

In the use of pile cutting devices it is usual that some sort of ribbon wire be fed through a groove in the guide, and this separate ribbon stock be sharpened to form the blade. Much looseness and inaccuracy occurs in such arrangement especially as the parts must be positioned by hand and consequently should a guide or cutter break when in use and a new cutter be utilized the exact point of change may be noticed on the work by the change in appearance in the work. Thus, should a cutter today become broken the work becomes a second; and in order that this situation may be improved and remedied, I have provided for the formation of a guide and cutter as integral with the cutting edge so arranged that it will always occur in the same position relative to the guide and an interchange of cutters may be had without any noticeable change in appearance upon the work. Further, by reason of the accuracy of these cutters several races or rows of threads may be cut at one time that the labor necessary may be reduced to a minimum; and the following is a more detailed description of the present embodiment of this invention, illustrating the preferred means by which these advantageous results may be accomplished:

With reference to the drawing, 15 represents a guide which is rectangular at its end 16 for mounting it in a holder or head, while its shank is swedged conical in shape as at 17 from the squared portion to a fine needle point 18 at its other end with a raised projecting portion 19 extending upwardly from the conical surface for a portion of the length thereof with one edge 20 extending radially outwardly from the axial center of the guide 17, while the other edge 21 is tapered and all sharpening occurs on this surface so as to maintain the relative position of the cutting edge in a radial line from the center and at the same position always with reference to the squared holding portion 16 of the guide.

In some instances instead of raising the cutting edge out of the same piece of stock I may provide a recess 22 in the shank of the guide 17 and position therein an individual blade 23 having portions 24 and 25 at its opposite ends over which the stock 26 and 27 of the shank of the guide is swaged, as in Fig. 11, so as to fasten the blade firmly into the guide member in an immovable manner and to effectively cause it to be integral therewith. This cutter will have one surface 28 positioned radially from the center of the guide with the other surface 29 inclined to this surface 28 and this surface 29 will be that which is ground for sharpening of the blade.

This guide member 17 is mounted in some suitable head 30 which is provided with a recess 31 in the portion 34 thereof of a size to snugly fit the squared portion 16 of the guide 17. In order that this guide may be firmly held in position in the head 30 I have provided a clamping member 32 which has a bore 33 to receive the end portion 34 of the head and with a slot 35 extending across this bore for the reception of the squared portion 16 of the guide 17 when positioned in the slot 31. The screw 36 threaded through the upwardly extending conical portion 37 of the member 32 engages a notch 38 in the portion 34 of the head 30 which tends to locate the member 32 and also by turning this screw the head is drawn up snugly against the squared portion 16 to hold it firmly in the recess 31 in the head. A threaded screw 40 engages the end wall 42 of the binding member 32 and has threaded engagement with the hole 43 in the end of the head so that the head of this screw 40 will assist in maintaining the member 32 in position on the head. The opening 41, however, is rather loose about the screw so that it will not affect the binding action of the member in its upward movement to hold the guide member 17 in position.

In some cases it is desirable that more than one guide be positioned in the head and I have illustrated an elongated slot at 45 in Fig. 13 and have there shown three squared ends 16 of guide members in the slot all bound in position by a somewhat more elongated member 32 but of the same general construction as that heretofore described.

In use, the needle point of the guide 17 is positioned beneath the rows of threads which are to be cut to form the pile, and I have illustrated in Fig. 14 this device as positioned to perform the so-called "slip cut" in the space 46 as distinguished from the "race cut" should the device be positioned in the space 47. Thus, it will be apparent that two threads instead of one will be cut for the formation of the pile.

It will of course be apparent that the dimension of the squared ends 16 laterally or in the dimension $a$ in Fig. 3 will be of utmost importance where a plurality of rows of cuts are to be performed in a single operation, such as indicated in Fig. 13, as this dimension must be substantially the distance of the rows apart in the cloth as woven which may differ somewhat in different fabrics woven under different conditions; and in cases where the exact dimension is not provided shims or spacers may be positioned between the needles in order that they be spaced the proper distance apart.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. A pile cutter comprising a guide member of a long conical shape with a needle-like point, and a blade provided on said guide member extending but a short distance of the length thereof and formed as one piece therewith and beveled on one side only to provide a cutting edge, said member at its large end merging into a square section for mounting it in position, said square section having a surface arranged relative to the straight surface of said blade to provide a positive fixed relationship between said squared section and said blade.

2. A pile cutter comprising a guide member of a long conical shape with a needle-like point, a blade provided on said guide member extending but a short distance of the length thereof and of one piece therewith, said member at its large end merging into a one-piece square section for mounting it in position, said square section having a surface arranged relative to the straight surface of said blade to provide a positive fixed relationship between said squared section and said blade, and a head having a recess to receive and snugly fit said squared section.

3. A pile cutter comprising a plurality of generally parallel guide members side by side each of a long conical shape with a needle-like point, a blade provided on each of said guide members extending but a short distance of the length thereof, each member at its large end merging into a rectangular section for mounting it in position, and a head having a recess to receive a plurality of said members at their rectangular section.

4. A pile cutter comprising a guide member of a long conical shape with a needle-like point, a blade provided on said guide member extending but a short distance of the length thereof and of one piece therewith, said member at its large end merging into a one-piece rectangular section for mounting it in position, a head having a recess to receive and snugly fit said rectangular section, and means for binding said guide member in positon in said recess.

5. A pile cutter comprising a plurality of generally parallel guide members side by side each of a long conical shape with a needle-like point, a blade provided on said guide member extending but a short distance of the length thereof, each member at its large end merging into a rectangular section for mounting it in position, a head having a recess to receive said plurality of guide members at their rectangular section, and means for binding said guide members in position in said recess.

6. A pile cutter comprising a guide member of a long conical shape with a needle-like point and provided with a recess therein, and a blade in said recess having reduced end portions and of a length and thickness to snugly fit said recess, said blade being held in said recess by material integral with the guide and located at the end of the recess overlapping and tightly engaging said reduced end portions.

7. A pile cutter comprising a guide member of a long conical shape with a needle-like point, and a blade provided on said guide member extending but a short distance of the length thereof and formed as one piece therewith and having a surface extending radially of the guide, said member at its large end merging into a square section with a surface generally parallel with said blade extending surface, and a head having a recess to receive and snugly fit said squared section and means for binding said guide member in said recess including a member having a slot therein for the reception of the head with said squared section.

8. A pile cutter comprising a guide member of a long conical shape with a needle-like point, and a blade provided on said guide member extending but a short distance of the length thereof and formed as one piece therewith and beveled on one side only to provide a cutting edge, said member at its large end merging into a polygonal section for mounting it in position, said polygonal section having a surface arranged relative to the straight surface of said blade to provide a positive fixed relationship between said polygonal section and said blade.

WILLIAM S. MOODY, Jr.
GEORGE C. LEMOI.